(12) United States Patent
Kitchin

(10) Patent No.: US 8,762,551 B2
(45) Date of Patent: Jun. 24, 2014

(54) POINT COORDINATOR DELEGATION IN A WIRELESS NETWORK

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 690 days.

(21) Appl. No.: 10/208,995

(22) Filed: Jul. 30, 2002

(65) Prior Publication Data

US 2004/0024871 A1 Feb. 5, 2004

(51) Int. Cl.
*G06F 15/16* (2006.01)

(52) U.S. Cl.
USPC ........... 709/229; 709/225; 370/462; 370/329; 370/341

(58) Field of Classification Search
USPC .......... 709/225, 232, 229, 223–224; 370/347, 370/239–341; 713/201
See application file for complete search history.

(56) References Cited

U.S. PATENT DOCUMENTS

| | | | | |
|---|---|---|---|---|
| 4,779,089 A * | 10/1988 | Theus | | 710/244 |
| 5,574,728 A * | 11/1996 | Mamaghani et al. | | 370/462 |
| 6,389,474 B1 * | 5/2002 | Chien et al. | | 709/232 |
| 6,564,060 B1 * | 5/2003 | Hoagland | | 455/450 |
| 6,813,260 B1 * | 11/2004 | Fogle | | 370/338 |
| 7,013,345 B1 * | 3/2006 | Brown et al. | | 709/236 |
| 7,028,097 B2 * | 4/2006 | Bard | | 709/232 |
| 7,190,686 B1 * | 3/2007 | Beals | | 370/337 |
| 2001/0016896 A1 * | 8/2001 | Pitts | | 711/136 |
| 2002/0019880 A1 * | 2/2002 | Sakakura | | 709/245 |
| 2002/0071413 A1 * | 6/2002 | Choi | | 370/337 |
| 2002/0120740 A1 * | 8/2002 | Ho et al. | | 709/225 |
| 2002/0126635 A1 * | 9/2002 | Sugiyama et al. | | 370/329 |
| 2002/0155852 A1 * | 10/2002 | Bender | | 455/522 |
| 2002/0181434 A1 * | 12/2002 | Kruys | | 370/347 |
| 2003/0003938 A1 * | 1/2003 | O'Neill et al. | | 455/519 |
| 2003/0081628 A1 * | 5/2003 | Sugar et al. | | 370/461 |
| 2003/0128684 A1 * | 7/2003 | Hirsch et al. | | 370/338 |
| 2003/0152059 A1 * | 8/2003 | Odman | | 370/338 |
| 2003/0169763 A1 * | 9/2003 | Choi et al. | | 370/462 |
| 2003/0196115 A1 * | 10/2003 | Karp | | 713/201 |
| 2004/0002357 A1 * | 1/2004 | Benveniste | | 455/550.1 |
| 2004/0008679 A1 * | 1/2004 | Sinnarajah et al. | | 370/390 |
| 2004/0073530 A1 * | 4/2004 | Stringer-Calvert et al. | | 707/1 |
| 2005/0174958 A1 * | 8/2005 | Miller et al. | | 370/321 |

\* cited by examiner

*Primary Examiner* — Abdullahi Salad
(74) *Attorney, Agent, or Firm* — Trop, Pruner & Hu, P.C.

(57) ABSTRACT

A point coordinator in a wireless network, such as a wireless local area network (WLAN), may have the authority to control access to a channel by nodes in the network. The point coordinator may delegate the authority to a node in the network which requests access. The point coordinator may limit the extent of the delegation to a certain transaction or a predetermined amount of time.

18 Claims, 5 Drawing Sheets

POINT COORDINATOR DELEGATION IN A WIRELESS NETWORK

BACKGROUND

A Wireless Local Area Network (WLAN) may operate as an ad-hoc network or as an infrastructure network. In an ad-hoc network, all nodes may be peers and admission to the network defined loosely. In an infrastructure network, there may be a master node, typically referred to as an access point, which may be responsible for regulating admission to the network. Any node attempting to join the network may be required to exchange negotiation messages with the access point in order to be admitted to the network.

WLANs may use either a distributed channel access scheme, a centralized channel access scheme, or some combination of both. In a distributed channel access scheme, all nodes in the network may be capable of initiating an attempt to access the channel. In a centralized channel access scheme, a master channel access node, typically referred to as the point coordinator, may be responsible for deciding which node may be permitted to access the channel at any given time. The type of channel access scheme used in the WLAN may depend on the network configuration, the type of data transmitted between nodes in the network, and the amount of traffic in the network.

DETAILED DESCRIPTION

Figure 1:
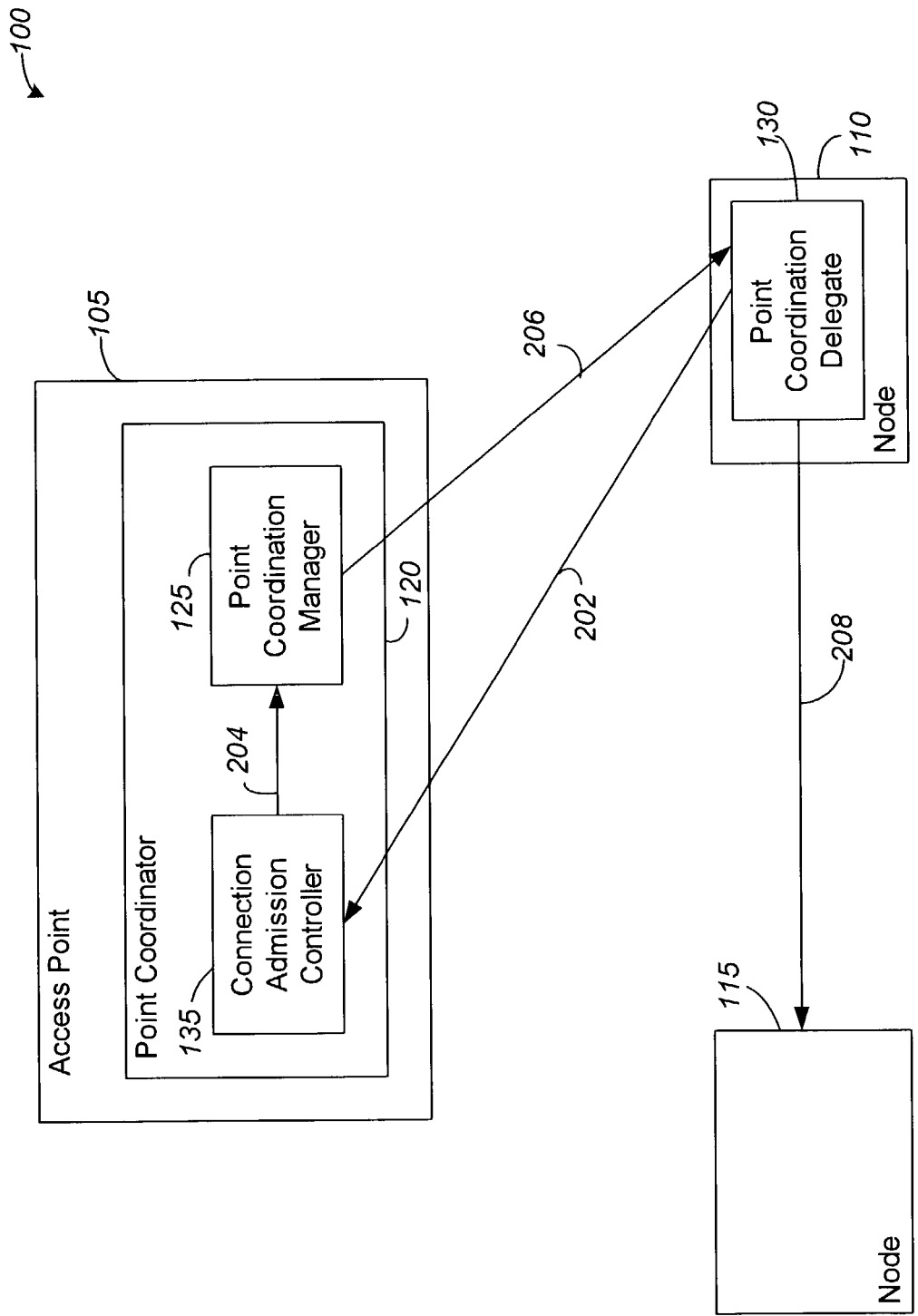
FIG. 1 illustrates a wireless network according to an embodiment.

FIG. 1 illustrates a wireless network 100 including an access point 105 and a number of nodes, including a transmitting node 110 and a receiving node 115. The access point 105 may be, for example, a software program running on a computer with a Wireless Local Area Network (WLAN) network interface card (NIC). The access point 105 may be responsible for regulating admission to the network 100. Any node attempting to join the network may be required to exchange negotiation messages with the access point 105 in order to be admitted to the network. The negotiation messages may result in the distribution of an encryption key to the admitted node.

The network may use a centralized channel access scheme. A master channel access node, also referred to as a point coordinator 120, may be responsible for making decisions as to which node may be permitted to access the channel, at any given time, in order to transmit a packet or packets of data over the medium. The point coordinator 120 may be used to prioritize and coordinate traffic over the medium.

The point coordinator 120 may be a function of the access point 105. Alternatively, the point coordinator 120 may be dynamically elected from nodes in the network which are capable of performing the point coordination function.

The point coordinator 120 may have absolute priority over any channels in the medium. The point coordinator 120 may transfer this priority to a client node in the network for a given transmission frame. Nodes which are not the point coordinator 120 must typically either wait to be polled by the point coordinator 120 or attempt to access the channel using a distributed method. When the node's turn in the poll comes, the point coordinator 120 may send the node a data packet with a poll token. The receiving node may then send back an acknowledgement (ACK) message.

A point coordination channel access scheme may be more efficient, e.g., have a higher ratio of actual link throughput to peak bit rate, when the point coordinator 120 transmits the bulk of the data. In this case, the point coordinator 120 may typically access the channel either deterministically or with a statistically higher priority than other nodes. In order to maximize channel access efficiency in cases in which significant traffic originates from nodes which would otherwise not be the point coordinator 120, the point coordinator 120 may be able to delegate the point coordination function to such nodes.

The point coordinator 120 may include a point coordination manager 125, which operates to delegate the point coordination function to other nodes in the network which include a point coordination delegate 130 for a given period of time or for a given transaction. The node 110 includes a point coordination delegate 130. The point coordination delegate 130 may enable the node 110 to perform the point coordination function. The node 110 may be a personal computer with a WLAN NIC, and the point coordination delegate 130 may be a software program running on the personal computer. Each wireless link-layer segment, defined as the set of nodes associated with a single wireless network admission entity, e.g., an access point, contains one point coordination manager 125 and zero or more point coordination delegates 130.

The point coordination manager 125 may be responsible for managing all centralized channel access in the network. The point coordination manager 125 may determine which node or nodes have authority to control point coordinated channel access at any given time. The point coordination manager 125 may retain this control. The point coordination manager 125 may revoke such delegation, returning complete channel access control to itself at any time.

The point coordinator 120 may include a connection admission controller 135. The connection admission controller may handle requests from nodes for bandwidth or access to the channel with a given set of parameters. The connection admission control function performed by the connection admission controller 135 may be distinct from the channel access function performed by the point coordination manager 125, which deals with access to the channel to transmit individual packets.

The point coordination manager 125 may make a determination as to the traffic characteristics of the packets flowing between two or more nodes in the network, in which the transmitter or transmitters are distinct nodes from itself. However, the receiving node or nodes may include the node containing the point coordination manager 125. This determination may be made through the exchange of messages, which may be communicated between the point coordination manager 125 and the connection admission controller 135. In this manner, the point coordination manager 125 may determine which bandwidth reservations for transmission have been made by each node. Alternatively, the point coordination manager 125 may make such a determination by inference, observing traffic actually sent. The observed traffic may include control or management packets which are part of the channel access mechanism. The point coordination manager 125 may use this information to make forward predictions as to the bandwidth requirements of transmitting nodes.

Having made a determination as to the transmission requirements or reservations of transmitting nodes, the point coordination manager 125 may delegate authority to control all or part of the point coordination channel access mechanism to another node, e.g., node 110 including the point coordination delegate 130. By delegating this authority to a node which may be responsible for transmitting a substantial amount of traffic, the overall channel access mechanism can be made more efficient.

Figure 2:
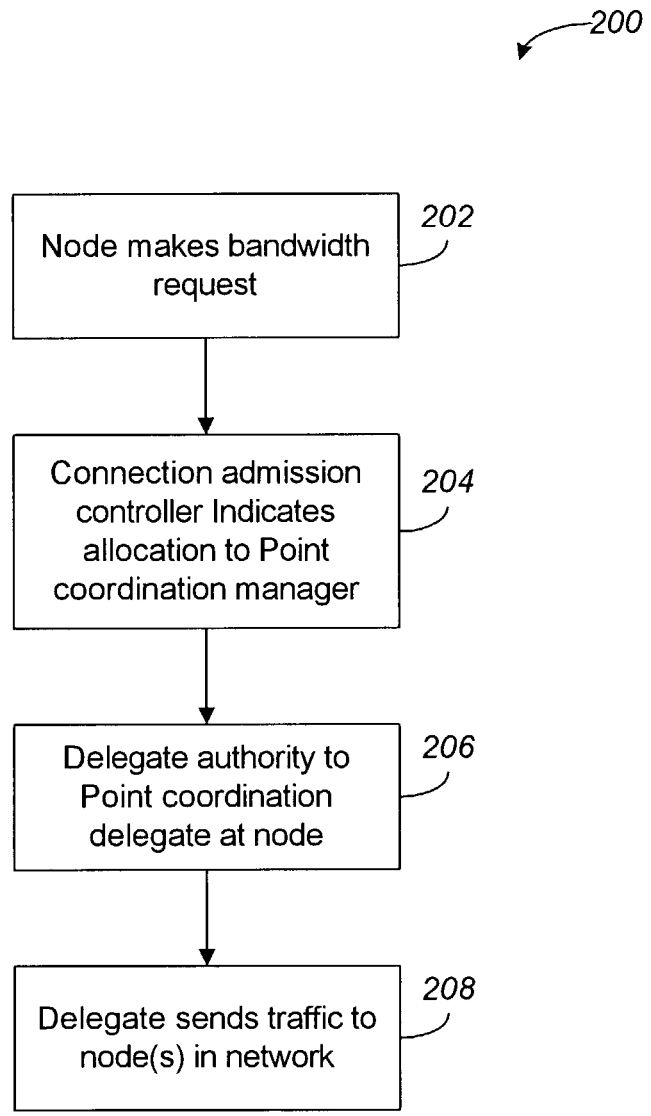
FIG. 2 is a flowchart describing a channel access scheme according to an embodiment.

FIG. 2 is a flowchart describing a point coordination function delegation operation 200 according to an embodiment. A node in the network may make a request for bandwidth to the connection admission controller 135 (block 202). This may involve an exchange of messages. The connection admission controller 135 indicates an allocation to the point coordination manager 125 (block 204). The point coordination manager 125 may consider the allocation and any other allocations it has previously been made aware of and use this information to delegate authority to manage point coordination functions to the source of the traffic (block 206). The point coordination delegate 130 may use point coordination functions to send traffic to one or more receiving nodes 115 (block 208). The point coordination delegate 130 may also be authorized to send poll messages to the receiving node or nodes 115 in order to permit them to access the channel.

Figure 3:
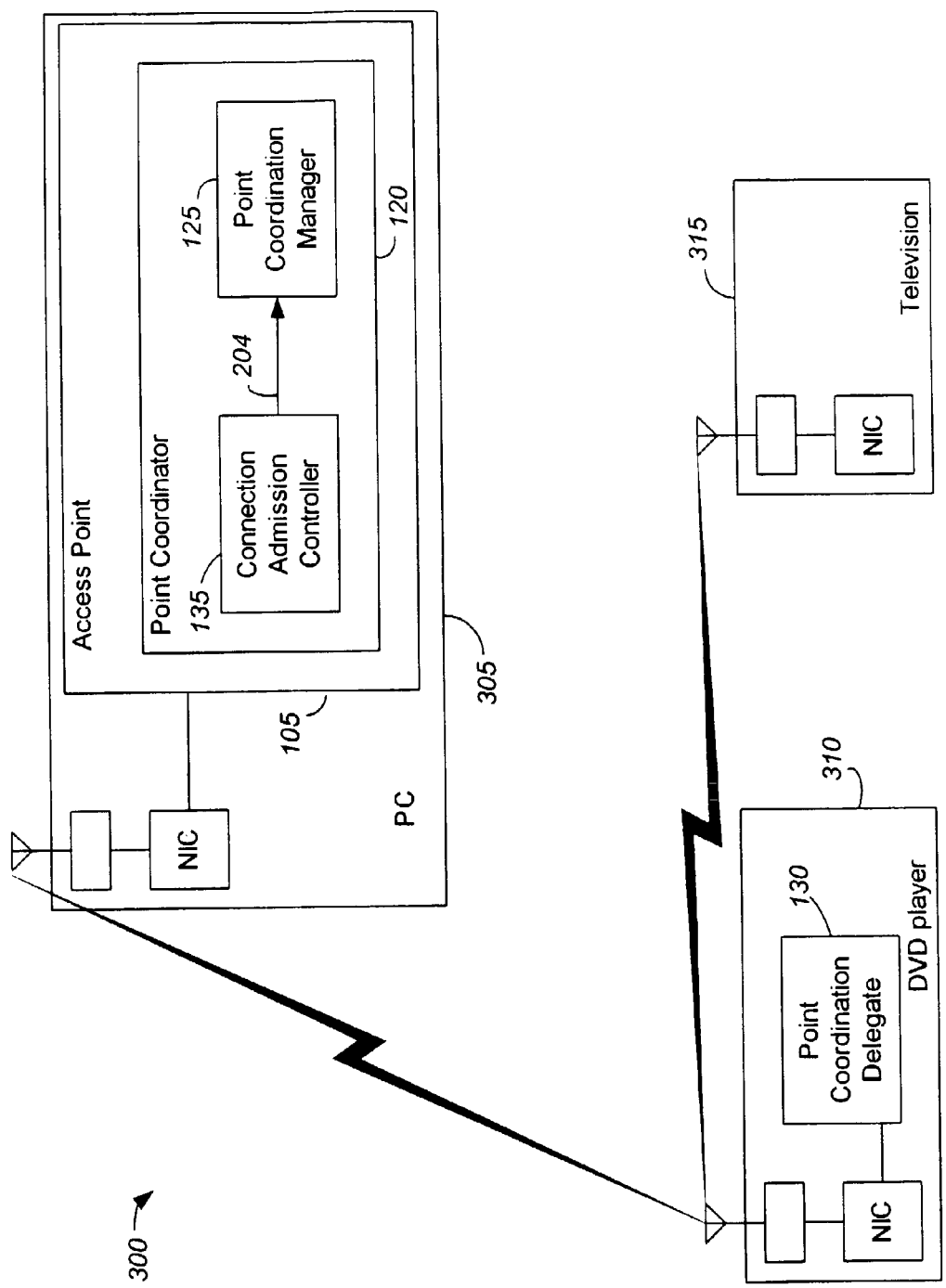
FIG. 3 illustrates a home wireless local area network (WLAN) according to an embodiment.

The point coordination delegation function may be useful in wireless networks in which there may be significant peer to peer traffic and/or multimedia traffic, such as in a multimedia home WLAN 300 shown in FIG. 3. The WLAN may include a personal computer (PC) 305 serving as the access point 105 and the point coordinator 120, a digital video disc (DVD) player 310 including a point coordination delegate 130, and a television 315. Each of the PC, the DVD player, and the television may include a wireless transceiver and a WLAN NIC and may communicate with each other over a WLAN channel. The DVD player 310 may transmit packets including video information to the television 315 over the channel for display on the television. The television may send an acknowledgement to the DVD player over the channel for each received packet. In one mode, the PC 305 may control access to the channel, giving access alternately to the DVD player 310 and the television 315 to send the packets and acknowledgements, respectively. In another mode, the point coordination manager 125 in the PC may delegate control of the channel to the point coordination delegate in the DVD player 310. The point coordination manager 125 may delegate control for a given period of time or a particular transaction. The DVD player 310 may then send one or more packets to the television and then give the television 315 access to the channel, enabling the television to send acknowledgement messages for the packets it receives.

The WLAN 300 may include multiple wireless communication channels, e.g., in different frequency ranges. In order to conserve bandwidth in one channel, the point coordination manager 125 may push the DVD player 310 and the television 315 from one channel onto another channel when delegating control to the DVD player 310. The DVD player 310 and television 315 then communicate on the new channel for the period of delegation specified by the point coordination manager.

Figure 4:
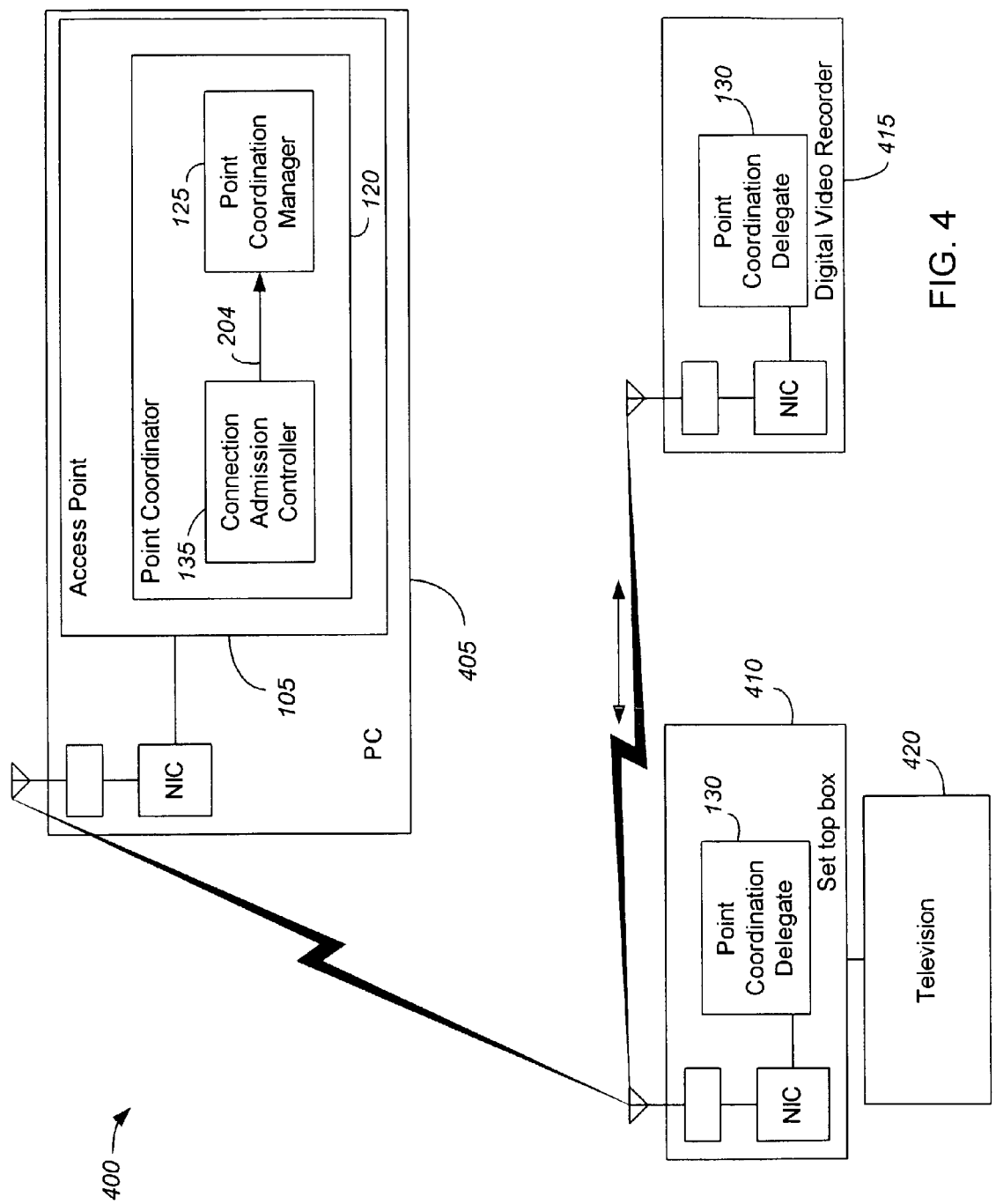
FIG. 4 illustrates a home WLAN according to another embodiment.

FIG. 4 illustrates a home WLAN 400 including a PC 405 serving as the access point 105 and the point coordinator 120, a set top box 410 connected to, e.g., a cable or satellite signal source, and a digital video recorder 415. The set top box 410 and the digital video recorder 415 may communicate on a bi-directional channel. The set top box 410 may send video information from the cable or satellite in one data stream to the digital video recorder 415, which may record the video information. The digital video recorder may send previously recorded video information in another data stream on the same channel to the set top box for display on a television 420. The point coordination manager 125 may delegate control of the channel to the set top box 410. The set top box may use the delegated authority to transmit packets to the digital video recorder, and then give the digital video recorder access to the channel to send acknowledgements back to the set top box. The set top box may also sub-delegate control of the channel to the digital video recorder, e.g., for a given period of time. The digital video recorder may use the delegated authority to transmit packets to the set top box, and then give the set top box access to the channel to send acknowledgements back to the digital video recorder.

Figure 5:
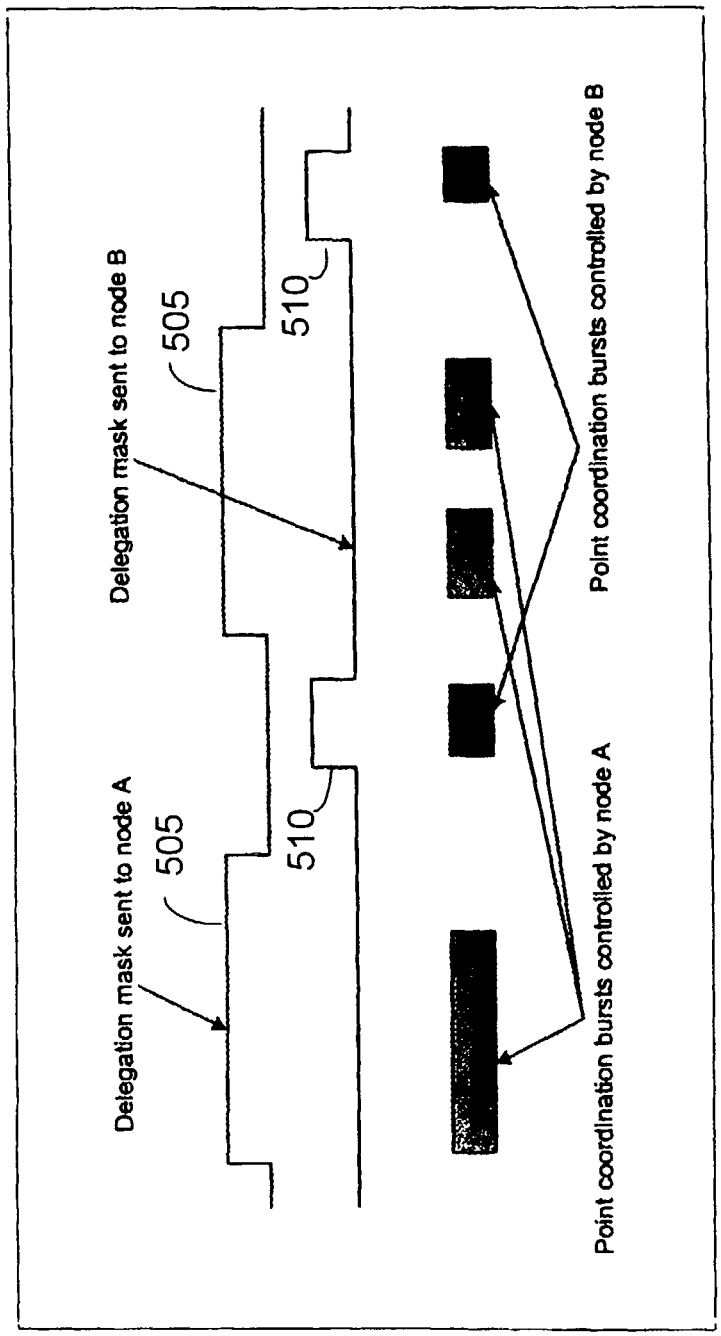
FIG. 5 is a timing diagram describing a point coordination delegation operation according to an embodiment.

The point coordination manager 125 may retain some control when delegating limited authority to control point coordinated channel access to one or more nodes including a point coordination delegate 130. In delegating such authority, the point coordination manager 125 may indicate a set of parameters within which the point coordination delegate 130 may operate. For example, it may indicate time slices within which the point coordination delegate 130 may be authorized to exercise point coordinated channel access control, as shown in FIG. 5.

In this example, two nodes, designated node A and node B, have regular repeating periods of time 505, 510 in which they have point coordination authority delegated to them. The intervals 505 and 510 for nodes A and B, respectively, may be non-overlapping, as shown in FIG. 5, such that at any given time there may be only one point coordination delegate 130 authorized to use the point coordination scheme. During those intervals, point coordination authority may be delegated to the appropriate node, and the node may initiate point coordinated channel access.

The point coordination manager 125 may restrict the nodes to which a point coordination delegate 130 may be permitted to send traffic using the point coordination function. The point coordination manager 125 may also restrict the nodes to which the point coordination delegate 130 may be permitted to transmit a poll message.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

A non-transitory computer readable medium comprising a machine-readable medium which stores machine-executable instructions, the instructions causing a machine to control, by a particular node in a plurality of nodes in a wireless network, access to a channel by each node in the plurality of nodes, and temporarily delegate said control to a first node in said plurality of nodes.

The invention claimed is:
1. A method comprising:
assigning a node one of at least two channels;
controlling, from a particular node in a plurality of nodes, access to at least two channels by each node in the plurality of nodes in a wireless network;
temporarily delegating said controlling, from the particular node to a first node in said plurality of nodes and assigning one of said two channels to the first node;
delegating control of access to the channel to the first node in a first plurality of time intervals; and delegating control of access to the channel to a second node in said plurality of nodes in a second plurality of time intervals,
wherein the first plurality of time intervals and the second plurality of time intervals are non-overlapping.

2. The method of claim 1, further comprising reclaiming said controlling of access to the channel from the first node.

3. The method of claim 2, wherein said reclaiming comprises reclaiming said controlling of access to the channel after a given transaction performed by the first node.

4. The method of claim 2, wherein said reclaiming comprises reclaiming said controlling of access to the channel after a predetermined time period.

5. The method of claim 1, further comprising switching the first node and one or more nodes from a first channel to a second channel for a duration of a transaction, wherein said one or more nodes are operative to communicate with the first node in a transaction.

6. A non-transitory computer readable medium comprising a machine-readable medium which stores machine-executable instructions, the instructions causing a machine to:
assign a node one of at least two channels;
control, by a particular node in a plurality of nodes in a wireless network, access to at least two channels by each node in the plurality of nodes;
temporarily delegate said control to a first node in said plurality of nodes and assign one of said two channels to the first node;
delegate control of access to the channel to the first node in a first plurality of time intervals; and
delegate control of access to the channel to a second node in said plurality of nodes in a second plurality of time intervals,
wherein the first plurality of time intervals and the second plurality of time intervals are non-overlapping.

7. The medium of claim 6, further comprising instructions operative to cause the machine to reclaim the control of access to the channel from the first node.

8. The medium of claim 7, wherein the instructions operative to cause the machine to reclaim control include instructions operative to cause the machine to reclaim the control of access to the channel after a given transaction performed by the first node.

9. The medium of claim 7, wherein the instructions operative to cause the machine to reclaim control include instructions operative to cause the machine to reclaim the control of access to the channel after a predetermined time period.

10. The medium of claim 6, further comprising instructions operative to cause the machine to switch the first node and one or more nodes from a first channel to a second channel for a duration of a transaction, wherein said one or more nodes are operative to communicate with the first node in a transaction.

11. Apparatus comprising:
a wireless transceiving node operative to assign a node one of at least two channels, control access to a channel by each node of a plurality of nodes in a wireless network and to delegate said control from the point coordinator to a first node in said plurality of nodes for a period of delegation and assign one of said two channels to the first node; and
an antenna coupled to said transceiving node,
wherein the point coordination manager is operative to delegate point coordination authority to the first node in a first plurality of time intervals and delegate point coordination authority to a second node in said plurality of nodes in a second plurality of time intervals, wherein the first plurality of time intervals and the second plurality of time intervals are non-overlapping.

12. The apparatus of claim 11, wherein the period of delegation comprises a predetermined time period.

13. The apparatus of claim 11, wherein the period of delegation comprises a transaction.

14. The apparatus of claim 11, further comprising an access point operative to control admission to the wireless network.

15. The apparatus of claim 11, further comprising a connection administration controller operative to receive requests for access to the channel from nodes in the network.

16. The apparatus of claim 11, wherein the network comprises a wireless local area network (WLAN).

17. The apparatus of claim 11, wherein the point coordinator is operative to control access to a plurality of channels in the wireless network.

18. The apparatus of claim 17, wherein the point coordination manager is operative to push the first node from a first channel to a second channel during the period of delegation.

* * * * *